United States Patent
Taguchi et al.

(10) Patent No.: US 10,866,332 B2
(45) Date of Patent: Dec. 15, 2020

(54) IMAGING SYSTEM, CONTROL METHOD OF IMAGING SYSTEM, AND STORAGE MEDIUM

(71) Applicant: SHARP KABUSHIKI KAISHA, Sakai (JP)

(72) Inventors: Shigenari Taguchi, Sakai (JP); Seiichi Hama, Sakai (JP); Nobuyuki Ashida, Sakai (JP); Kunihiko Iizuka, Sakai (JP); Takahiro Shindoh, Sakai (JP); Isao Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 16 days.

(21) Appl. No.: 16/373,319

(22) Filed: Apr. 2, 2019

(65) Prior Publication Data

US 2019/0324163 A1   Oct. 24, 2019

(30) Foreign Application Priority Data

Apr. 20, 2018   (JP) .................. 2018-081760
Dec. 27, 2018   (JP) .................. 2018-245853

(51) Int. Cl.
*G01T 7/00*   (2006.01)
*H04N 5/32*   (2006.01)

(52) U.S. Cl.
CPC ............... *G01T 7/005* (2013.01); *H04N 5/32* (2013.01)

(58) Field of Classification Search
CPC ........ G01T 7/005; H04N 5/32; H04N 5/3651; H04N 5/232; H04N 5/217
See application file for complete search history.

(56) References Cited

U.S. PATENT DOCUMENTS

| | | | |
|---|---|---|---|
| 4,660,082 A | 4/1987 | Tomohisa et al. | |
| 2013/0193334 A1* | 8/2013 | Dowaki ............. | H04N 5/345 250/370.09 |

FOREIGN PATENT DOCUMENTS

| | | |
|---|---|---|
| JP | S57-119565 A | 7/1982 |
| JP | S61-053868 A | 3/1986 |
| JP | 2000-513518 A | 10/2000 |
| JP | 2016-144079 A | 8/2016 |
| WO | 97/48225 A1 | 12/1997 |

\* cited by examiner

*Primary Examiner* — David P Porta
*Assistant Examiner* — Meenakshi S Sahu
(74) *Attorney, Agent, or Firm* — ScienBiziP, P.C.

(57) ABSTRACT

An imaging system includes an input voltage setting unit that applies an input voltage to an Amp transistor, a setting output value acquisition unit that acquires a corresponding output for each pixel, and a calibration characteristic deriving unit that derives an input-output characteristic indicating a correspondence relationship between the input voltage and the output and derives a calibration characteristic to be used for calibration based on an inverse characteristic of the input-output characteristic.

9 Claims, 13 Drawing Sheets

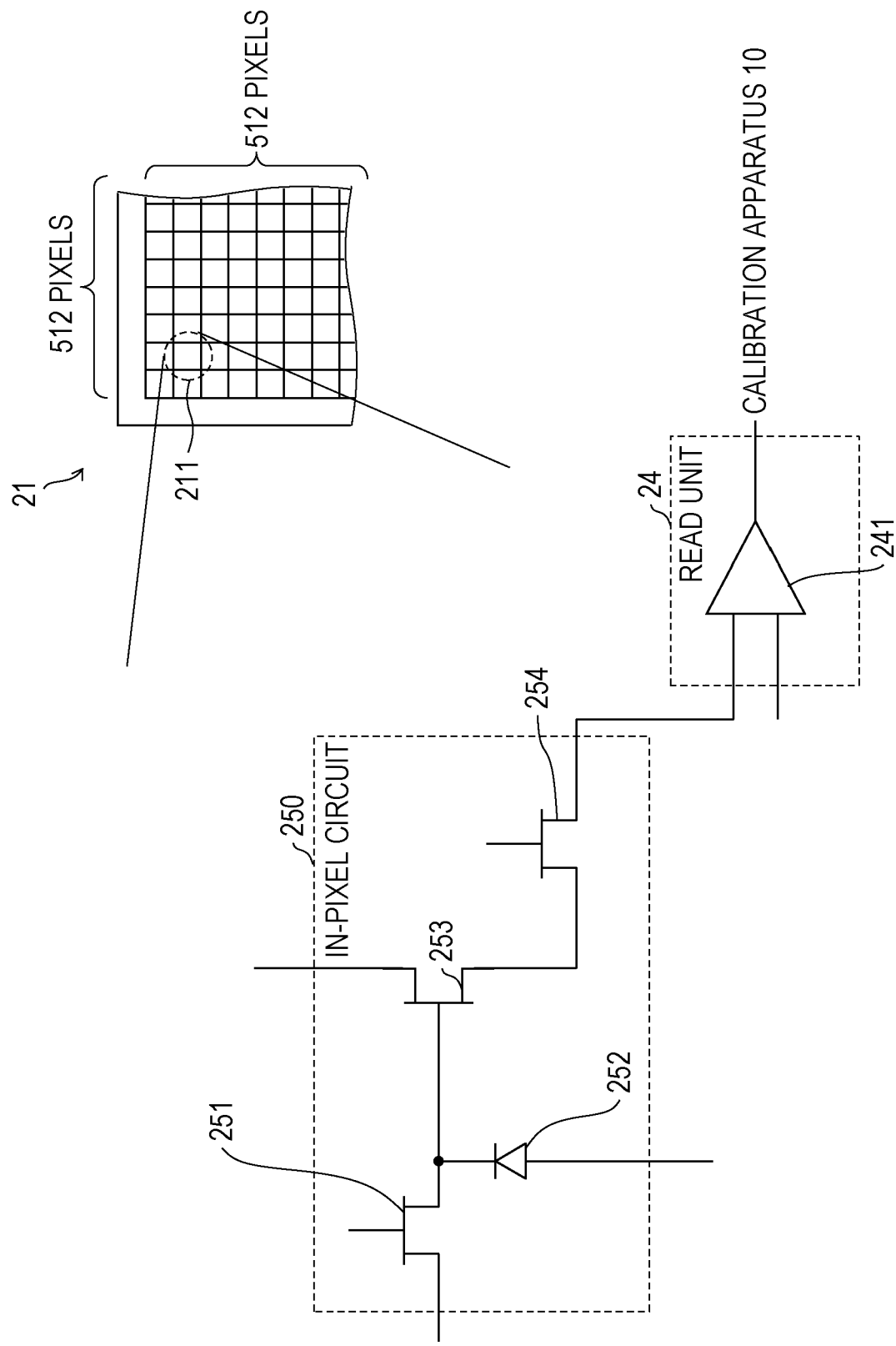

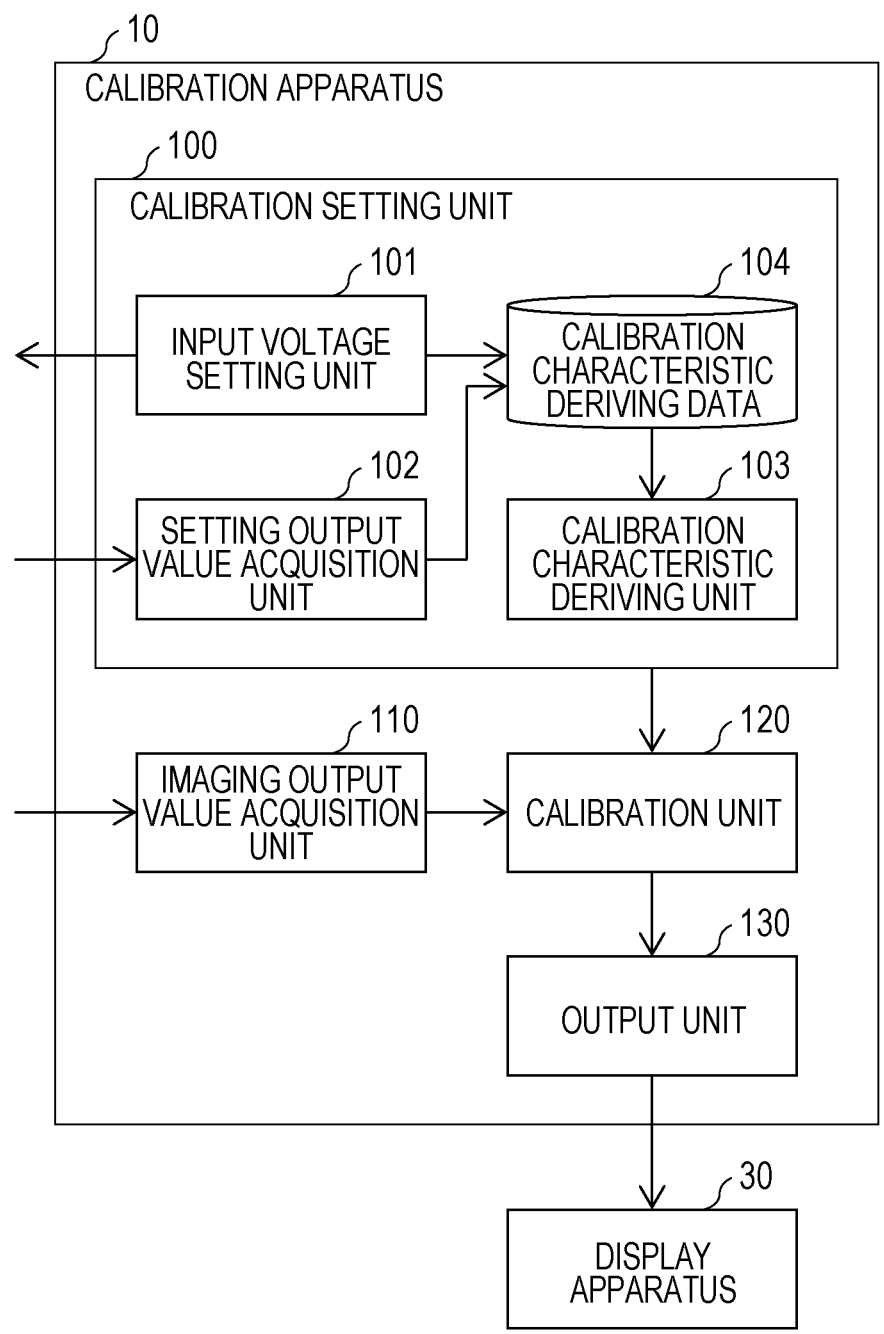

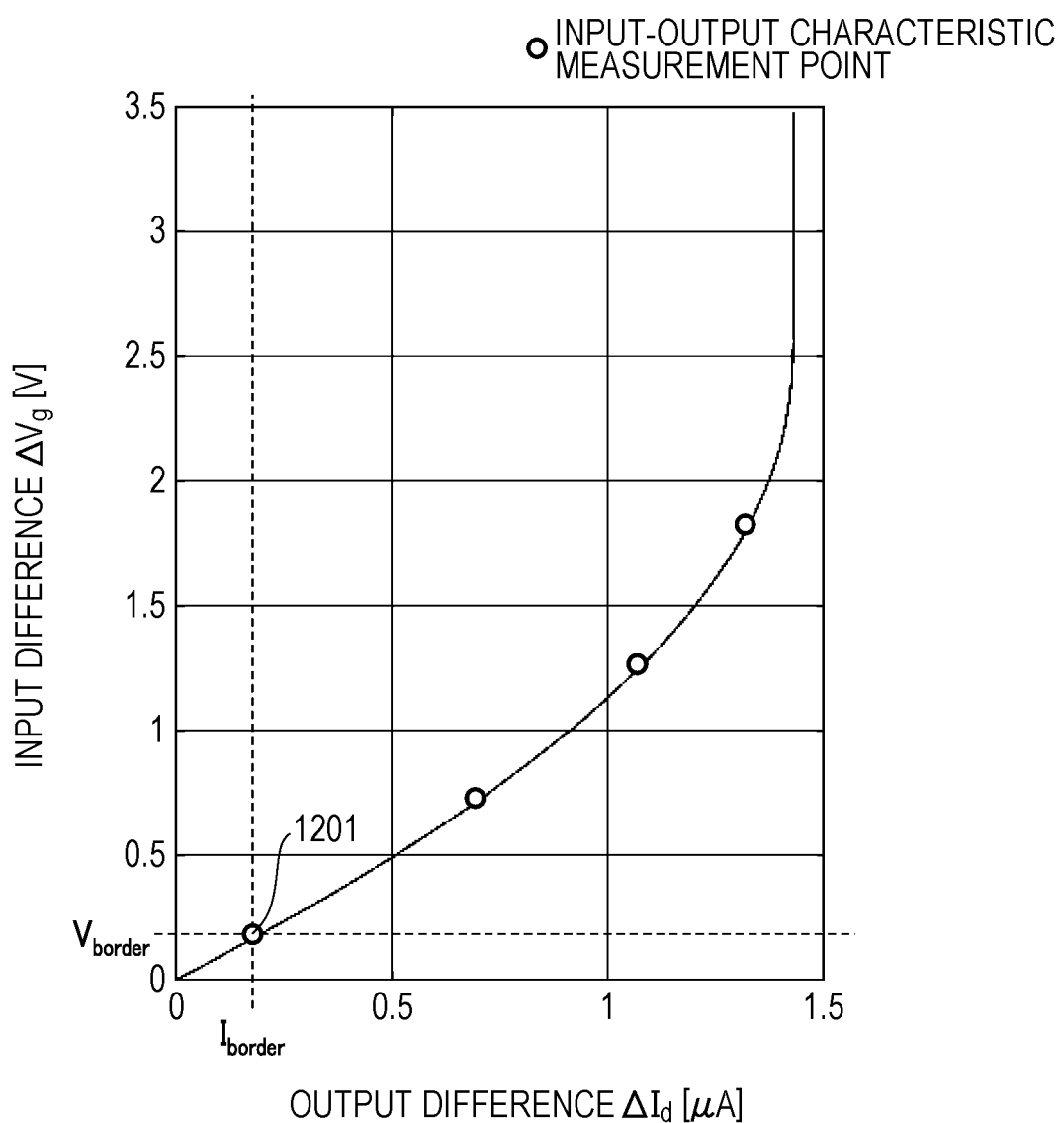

IMAGING SYSTEM, CONTROL METHOD OF IMAGING SYSTEM, AND STORAGE MEDIUM

BACKGROUND

1. Field

The present disclosure relates to an imaging system including a sensor element that generates an electrical signal based on a close of incident radiation.

2. Description of the Related Art

Examples of a sensor element that outputs an electrical signal corresponding to the dose of incident radiation, for example, X-rays include a direct conversion type sensor element in which X-rays are directly converted into the electrical signal, and an indirect conversion type sensor element in which X-rays are converted into light by a scintillator and then converted into the electrical signal by a photoelectric conversion element.

A panel for X-ray image capturing is configured in such a way that the sensor element is by provided for each pixel and the pixels are arranged in a two-dimensional matrix on a substrate (panel). In such a panel, a thin film transistor (TFT) element (hereinafter, referred to as a TFT element) is used for controlling each pixel. In any of the direct conversion type element and the indirect conversion type element, the electrical signals (electrical charges) generated in accordance with the dose of X-rays are accumulated in capacitance in each pixel.

A sensor that transfers the accumulated capacitance to an amplifier outside the panel through the TFT element is called a passive pixel sensor. A sensor that amplifies the accumulated capacitance by using the TFT element as an amplification element and transmits the amplified capacitance to an external circuit is called an active pixel sensor. Since the accumulated capacitance can be amplified within the pixel in the active pixel sensor, the active pixel sensor can obtain a large signal for the same dose compared to the passive pixel sensor. For that reason, there is an advantage that an appropriate signal can be obtained even with a low irradiation, amount.

In a case of detecting the X-rays using the sensor element, since a plurality of sensor elements are provided on the panel in a two-dimensional matrix form, it is demanded to correct variations in output voltage due to difference in characteristics of the sensor elements (calibration). In particular, in the active pixel sensor, an amplification unit is provided for each pixel, and the amplification, unit has high nonlinearity and there are variations in gain and offset, so that it is demanded to make corrections.

In Japanese Unexamined Patent Application Publication No. 61-53868 (Published on Mar. 17, 1986), a calibration method using a correction value obtained from a density value obtained by photoelectrically scanning two density reference plates having mutually different densities and a previously known density value is described.

In Japanese Unexamined Patent Application Publication No. 57-119565 (Published on Jul. 26, 1982), a method of correcting variations between bits of an analog signal output from an image sensor by reading a reference surface a plurality of times in advance and obtaining a correction value for each bit from the reading result is described.

However, technologies of the related art described above have the following problems. In Japanese Unexamined Patent Application Publication No. 61-53868 (Published on Mar. 17, 1986), the density reference plate having a known density value is photoelectrically scanned in advance. That is, the density value is obtained by irradiating the density reference plate with X-rays prior to imaging. However, it is demanded to perform X-ray irradiation under strict control, and the X-ray irradiation may not be done easily.

Japanese Unexamined Patent Application Publication No. 57-119565 (Published on Jul. 26, 1982) is the same as Japanese Unexamined Patent Application Publication No. 61-53868 (Published on Mar. 17, 1986) in that reading is performed in advance, and has the same adverse effect as Japanese Unexamined Patent Application Publication No. 61-53868 (Published on Mar. 17, 1986).

It is desirable; to realize an imaging system that can easily perform correction (calibration).

SUMMARY

According to a first aspect of the present disclosure, there is provided an imaging system including a plurality of pixels each of which includes a sensor element for generating an electrical signal based on a dose of incident radiation and an amplification transistor for amplifying the electrical signal, and the imaging system including a voltage application unit that applies an input-voltage to the amplification transistor at predetermined intervals, an acquisition unit that acquires an output corresponding to the input voltage for each of the pixels, and a calibration characteristic deriving unit that derives, for each of the pixels, an input-output characteristic indicating a correspondence relationship between the input-voltage and the output corresponding to the input voltage and derives a calibration characteristic to be used for calibration based on an inverse characteristic of the input-output characteristic.

According to second aspect, of the present disclosure, there is provided a control method of an imaging system including a plurality of pixels each of which includes a sensor element for generating an electrical signal based on a dose of an incident radiation and an amplification transistor for amplifying the electrical signal, the control method including applying an input voltage to the amplification transistor at predetermined intervals, acquiring an output corresponding to the input voltage for each of the pixels, and deriving, for each of the pixels, an input-output characteristic indicating a correspondence relationship between the input voltage and the output corresponding to the input voltage and deriving a calibration characteristic to be used for calibration based on an inverse characteristic of the input-output characteristic.

According to third aspect of the present disclosure, there is provided a storage medium storing a control program for causing a computer to function as the imaging system, according to the first aspect. The computer is caused to function as the voltage application unit, the acquisition unit, and the calibration characteristic deriving unit.

BRIEF DESCRIPTION OF THE DRAWINGS

FIG. 2 is a diagram illustrating a circuit configuration in a pixel included in an imaging sensor body;

FIG. 3 is a block diagram illustrating a configuration of a main part of a calibration apparatus;

FIG. 10A is a graph illustrating an example in a case where the reference potential of the pixel is set to specific potential, and FIG. 10B is a graph illustrating an example in a case where the reference potential is made different for each pixel;

FIG. 12 is a graph for explaining a derivation example of an input-output characteristic according to still another embodiment;

DESCRIPTION OF THE EMBODIMENTS

Embodiment 1

[Overview]

Figure 1:
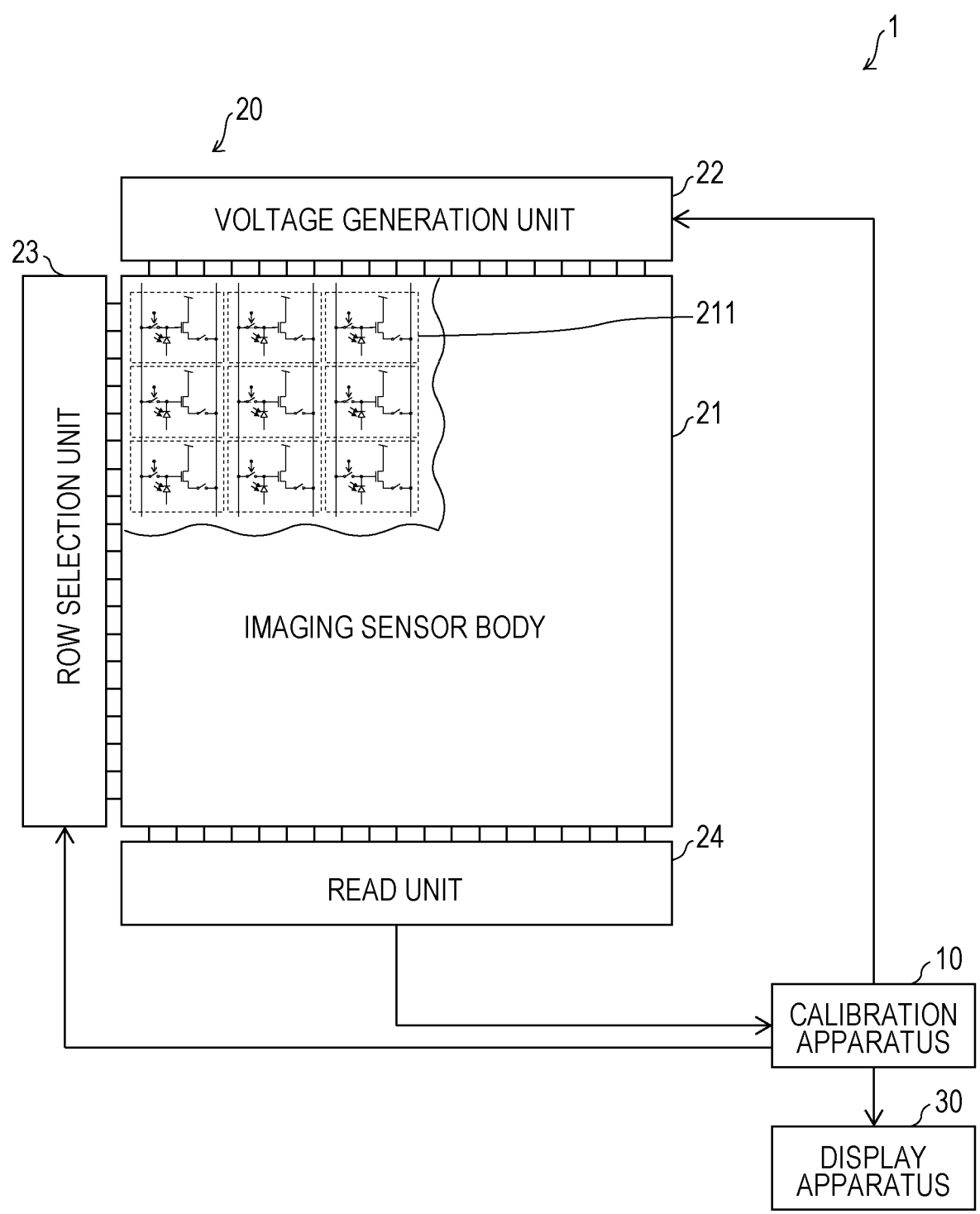
FIG. 1 is a diagram illustrating an overview of an imaging system according to an embodiment of the present disclosure.

Hereinafter, one embodiment of the present disclosure will be described in detail. First, an overview of an imaging system 1 according to this embodiment will be described with reference to FIG. 1. FIG. 1 is a diagram, illustrating an overview of the imaging system 1. As illustrated in FIG. 1, the imaging system 1 includes a calibration, apparatus 10, an imaging sensor 20, and a display apparatus 30. In the imaging system 1, the calibration characteristic is derived in the calibration apparatus 10, and an image captured by the imaging sensor 20 is calibrated by using the derived calibration characteristic and is displayed on the display apparatus 30. The calibration, characteristic is a characteristic used for calibration (correction), and is used for correcting a relative difference between pixels 211 included in the imaging sensor 20, such, as a correction, formula, a correction value, a correction coefficient, and the like, for example.

Although details will be described later, the calibration apparatus 10 acquires the characteristic of the pixel 211 by applying a voltage to each pixel 211 included in an imaging sensor body 21 of the imaging sensor 20 and derives the calibration characteristic based on the acquired characteristic.

With this configuration, the calibration apparatus 10 can derive the calibration characteristic without performing imaging in the imaging sensor 20 in advance. Therefore, it is unnecessary to perform various preparation, setting, management, and the like, that are executed, in the related art in order to perform imaging by X-rays in advance, and the calibration characteristic can be easily derived.

In the imaging system 1, calibration of the captured image can be performed using the calibration, characteristic. Therefore, in the imaging system 1, the calibration can be easily performed.

The imaging sensor 20 includes the imaging sensor body 21, a voltage generation unit 22, a row selection unit 23, and a read unit 24.

The imaging sensor body 21 is a body of an imaging sensor including a plurality of pixels 211 arranged in a two-dimensional matrix.

The voltage generation unit 22 generates a voltage to be applied to the pixel 211, and applies the generated voltage to each column.

The row selection unit 23 selects a row to which the voltage generated by the voltage generation unit 22 is to be applied. Since the voltage generation unit 22 applies the voltage to each column, the voltage generated by the voltage generation unit 22 can be applied to each, pixel 211 by the row selection unit 23 that selects a row.

The read unit 24 reads an output from the pixel 211 and transmits the output to the calibration apparatus 10. In the read unit 24, an AFE 241 to be described later is included.

[In-Pixel Circuit]

Next, with reference to FIG. 2, a circuit configuration in the pixel 211 will be described. FIG. 2 is a diagram illustrating a circuit configuration in the pixel 211. As illustrated in FIG. 2, the imaging sensor body 21 is configured by an array (in FIG. 2, an example of 512 vertical pixels×512 horizontal pixels is illustrated) in which a plurality of pixels 211 are arranged in a two-dimensional matrix and a scintillator (not illustrated) covering the front surface of the array. The scintillator has an X-ray-light conversion function that receives X-rays and converts the received X-rays into light.

As illustrated in FIG. 2, the in-pixel circuit 250 includes a calibration/reset switch 251, a photodiode (sensor element) 252, an Amp transistor (amplification transistor) 253, and a reed switch 254.

The calibration/reset switch 251 is a switch for applying a calibration setting voltage or reset voltage to a gate electrode of the Amp transistor 253. Here, the calibration setting voltage is a voltage to be applied to derive the calibration characteristic. The reset voltage is a voltage for resetting electric charges generated by the Photodiode 252.

An output of the photodiode 252 is connected to the gate electrode of the Amp transistor 253. With this configuration, when electrical charges (electrical signals) are generated by the photodiode 252 receiving light due to incidence of radiation, a voltage of the gate electrode of the Amp transistor 253 connected to the photodiode 252 changes. The Amp transistor 253 outputs a voltage change of the gate electrode as a current change between the drain and the source.

The Amp transistor 253 is a transistor that amplifies the electric signal.

The reed switch 254 is a switch for outputting the current between the drain and the source of the Amp transistor 253 to the outside of the pixel 211, and is controlled by the read unit 24.

The current output from the pixel 211 is amplified, is subjected to A/D conversion by the analog front end (AFE) 241 of the read unit 24, and is output to the calibration apparatus 10.

[Configuration of Calibration Apparatus 10]

Next, with reference to FIG. 3, the calibration apparatus 10 will be described. FIG. 3 is a block diagram illustrating a configuration of a main part of the calibration apparatus 10. As illustrated in FIG. 3, the calibration apparatus 10 includes a calibration setting unit 100, an Imaging output value acquisition unit 110, a calibration unit 120, and an output unit 130.

The calibration setting unit 100 sets the calibration characteristic of each pixel 211 of the imaging sensor 20. The calibration characteristic is a characteristic used for calibration. By calibrating the output from the imaging sensor 20 using the calibration characteristic, an appropriate value can be output.

More specifically, the calibration setting unit 100 includes an input voltage setting unit (voltage application unit) 101, a setting output value acquisition unit (acquisition unit) 102, a calibration characteristic deriving unit 103, and calibration characteristic deriving data 104.

The input voltage setting unit 101 sets an input voltage for deriving the calibration characteristic, and instructs the voltage generation unit 22 to apply the input voltage to the pixel 211. More specifically, the input voltage setting unit 101 successively sets the input voltages in accordance with predetermined conditions and applies the input voltages to the pixels 211 accordingly, information indicating the set input voltage is stored in the calibration characteristic deriving data 104. A flow of an input voltage setting process will be described later.

The setting output value acquisition unit 102 acquires an output when the input voltage set by the input voltage setting unit 101 is applied to the pixel 211 for each pixel 211 and stores the output in the calibration characteristic deriving data 104.

Figure 4A:
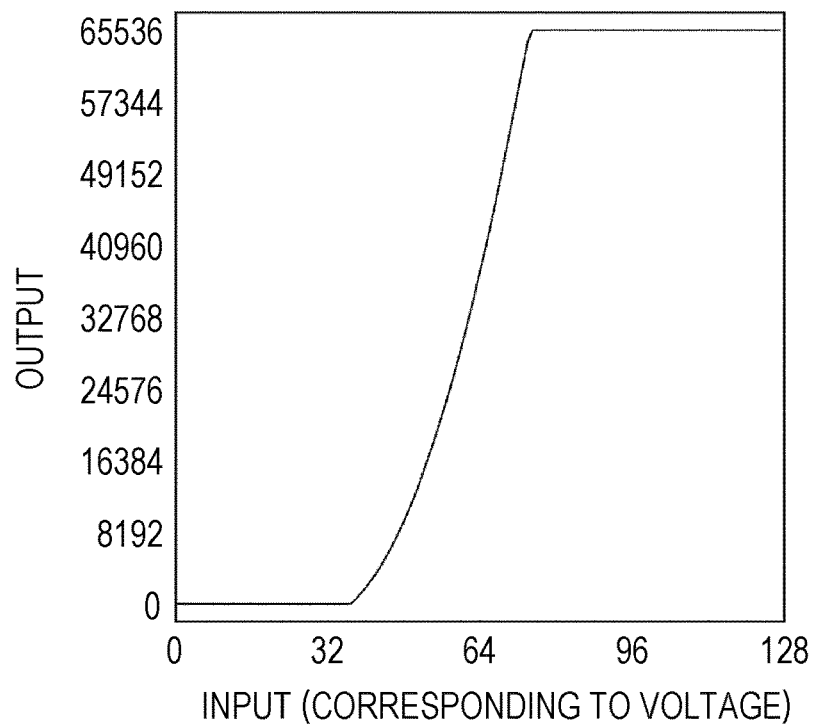
FIG. 4A is a graph illustrating a relationship between an input voltage set by an input voltage setting unit and an output acquired by a setting output value acquisition unit.
Figure 4B:
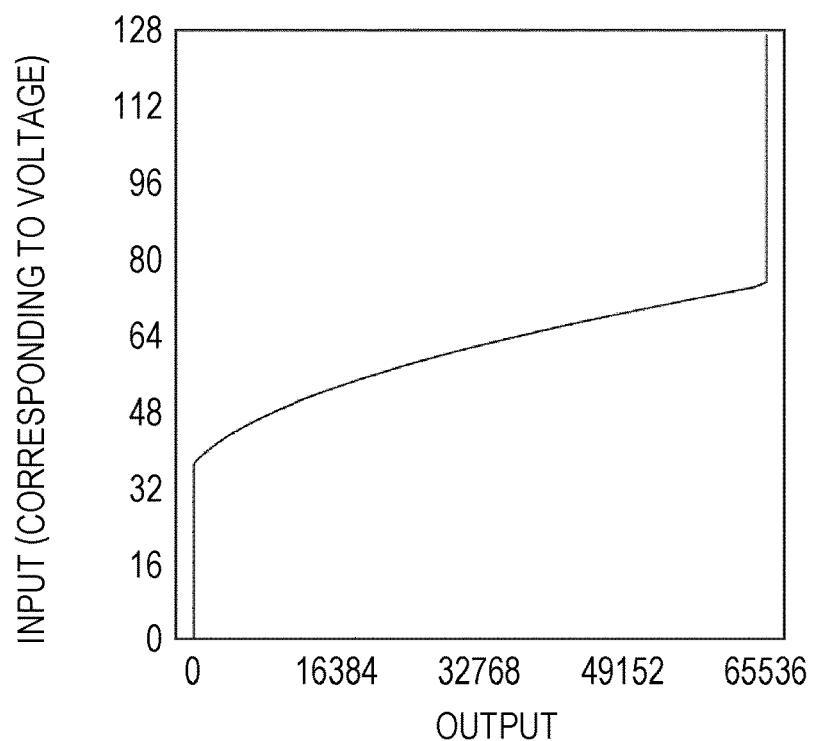
FIG. 4B is a graph illustrating an inverse characteristic of the graph illustrated in FIG. 4A.

The calibration characteristic deriving unit 103 derives the calibration characteristic from the relationship between the input voltage set by the input voltage setting unit 101 and the output acquired by the setting output value acquisition unit 102, which are stored in the calibration characteristic deriving data 104. With reference to FIGS. 4A and 4B, a method of deriving an example of the calibration characteristic will be described. FIG. 4A is a graph illustrating the relationship between the input voltage set by the input voltage setting unit 101 and the output acquired by the setting output value acquisition unit 102. In FIGS. 4A and 4B, an example of a single pixel 211 is illustrated. In the graph illustrated in FIG. 4A, the horizontal axis represents input (corresponding to voltage) and the vertical axis represents output (code value). Here, the output of a certain pixel 211 when the input is changed from 0 to 128 is illustrated. In the example illustrated in FIG. 4A, the output is 0 until the input exceeds 32 by being changed from 0, then the output changes from 0 to 65536 while the input reaches approximately 70. When the input exceeds 70, the output remains 65536.

When the input-output characteristic (input output characteristic) as illustrated in FIG. 4A is obtained from the input voltage set by the input voltage setting unit 101 and the output obtained by the setting output value acquisition unit 102, the calibration characteristic deriving unit 103 derives an inverse characteristic of the input-output characteristic as the calibration characteristic. An example of the derived calibration characteristic is illustrated in FIG. 4B. In FIG. 4B, the horizontal axis represents the output (code value) and the vertical axis represents the input (corresponding to the voltage). As such, by setting the inverse characteristic of the input-output characteristic as the calibration characteristic, it is possible to derive an input to the pixel 211 from the value output from the pixel 211.

With this configuration, even if the characteristic differs for each pixel 211, the calibration characteristic corresponding to the pixel 211 can be derived and the calibration can be appropriately performed. For example, suppose that there are three pixels of a pixel 211A, a pixel 211B, and a pixel 211C, and the input-output characteristics of the three pixels are as follows.

TABLE 1

| Input | Pixel 211A | Pixel 211B | Pixel 211C |
|-------|------------|------------|------------|
| V0    | 1000       | 1100       | 980        |
| V1    | 2000       | 2200       | 1960       |
| V2    | 3000       | 3300       | 2940       |
| V3    | 4000       | 4400       | 3920       |

Here, in a case where the output from the pixel 211A is 3000, the output from the pixel 211B is 3300, and the output from the pixel 211C is 2940, the output value is different for three pixels. However, if the calibration is performed using the calibration characteristic, it can be seen that the input of all three pixels was V2, that is, the same light amount (dose) was input to the three pixels. As such, by using the inverse characteristic of the input-output characteristic as the calibration characteristic, it is possible to easily and appropriately perform the calibration.

Here, the imaging output value acquisition unit 110 acquires the output when an imaging process is performed in the imaging sensor 20. Then, the imaging output value acquisition unit 110 transmits the acquired output to the calibration unit 120.

The calibration unit 120 performs calibration on the output transmitted from the imaging output value acquisition unit 110 by using the calibration characteristic set by the calibration setting unit 100, and transmits the value after the calibration to the output unit 130.

The output unit 130 transmits the value of the calibration performed by the calibration unit 120, for example, to the external display apparatus 30. Then, the display apparatus 30 displays the imaging result by the imaging sensor 20. The display apparatus 30 may be implemented by an apparatus external to the calibration apparatus 10 or may be included in the calibration apparatus 10.

[Flow of Process]

Figure 5:
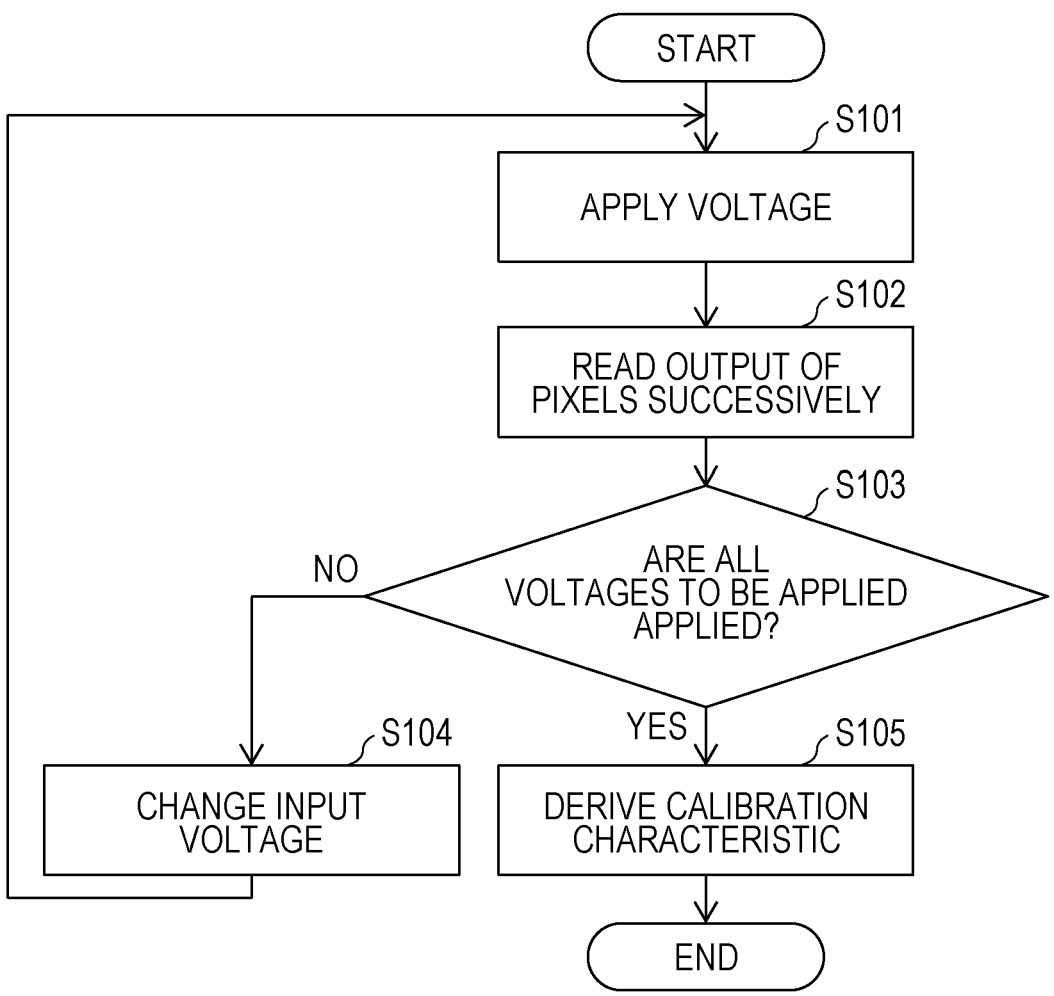
FIG. 5 is a flowchart illustrating a flow of a process of deriving a calibration characteristic by a calibration setting unit.
Figure 6:
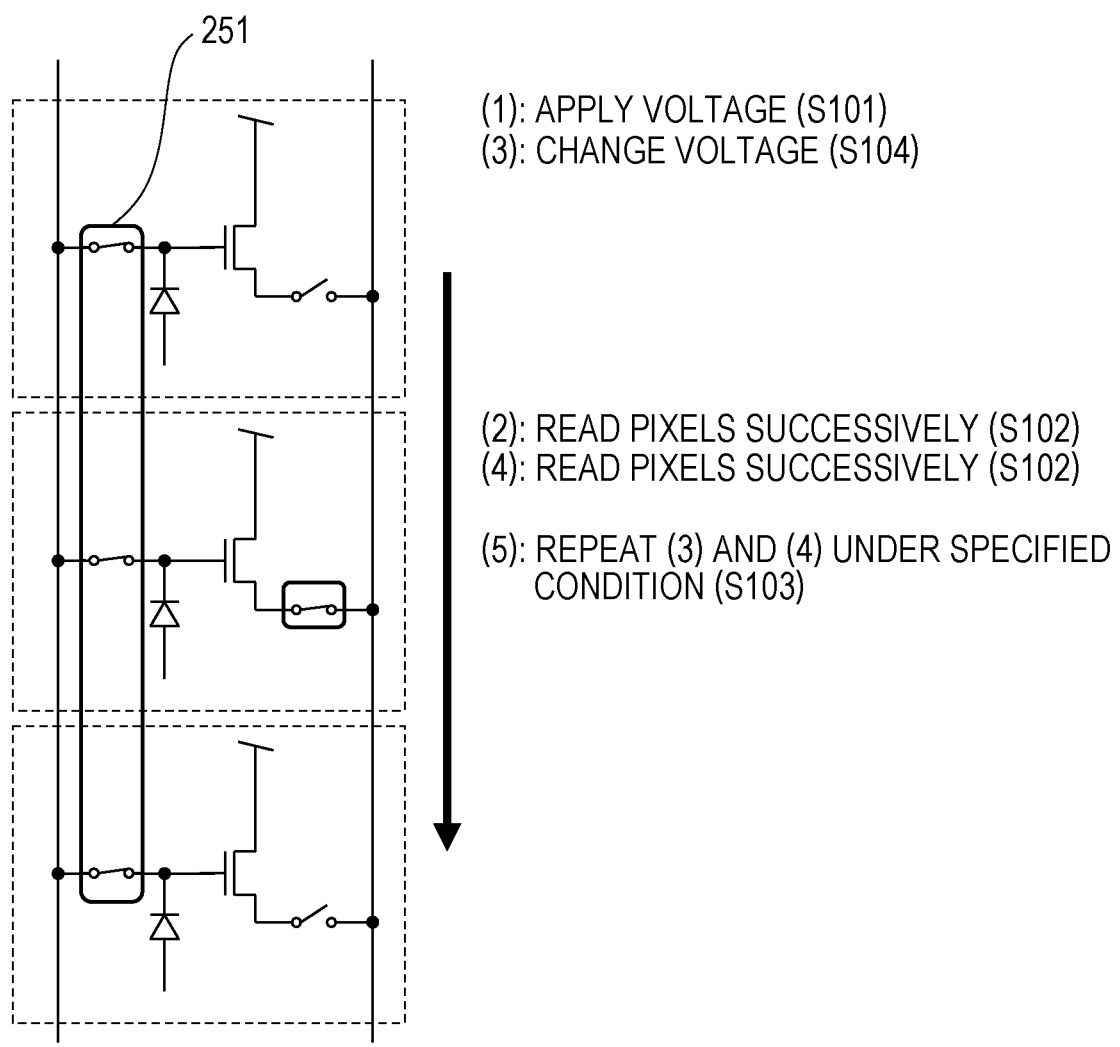
FIG. 6 is a circuit diagram for explaining a process of deriving the calibration characteristic.

Next, with reference to FIGS. 5 and 6, a flow of a process for deriving the calibration characteristic by the calibration setting unit 100 will be described. FIG. 5 is a flowchart illustrating the flow of process in which the calibration setting unit 100 derives the calibration characteristic. FIG. 6 is a circuit diagram for explaining the process of deriving the calibration characteristic. In the following, an example in which the input voltage changes from V0 to V127 will be described, but the input voltage to be applied is not limited to 128 levels from V0 to V127. The input voltage to be applied may be in ascending order from V0 to V127 or in descending order from V127 to V0. The input voltage may not be monotonously changed. Further, a range of the input voltage to be changed may be set over a range that can be changed at the time of actual imaging.

As illustrated in FIG. 5, first, the input voltage setting unit 101 sets an input voltage and applies the input voltage to the pixel 211 (S101, voltage applying step). In the description for the circuit diagram, all of the calibration/reset switches 251 illustrated in FIG. 6 are connected and the input voltage V0 for deriving the calibration characteristic is applied.

Next, the setting output value acquisition unit 102 acquires an output corresponding to the input voltage for each pixel 211 (S102, acquisition step). That is, in a state in which the input voltage V0 is applied, the read unit 24 successively reads the outputs of all pixels. When the outputs of all pixels 211 arranged in the imaging sensor body 21 are acquired, the calibration setting unit 100 determines whether or not all voltages to be applied are applied (S103). When it is determined that all voltages to be applied are not applied (NO in S103), the input voltage setting unit 101 changes the input voltage (S104). That is, the input voltage is changed from V0 to V1. Then, the process returns to step S101.

On the other hand, when it is determined that all voltages to be applied are applied (YES in S103), that is, if the input voltage has been changed to V127, the calibration characteristic deriving unit 103 derives the calibration characteristic from the input-output characteristic (S105, calibration characteristic deriving step).

Embodiment 2

Another embodiment of the present disclosure will be described below. For convenience of explanation, members having the same functions as the members described in the embodiment described above are denoted by the same reference numerals, and description thereof will not be repeated.

Figure 7:
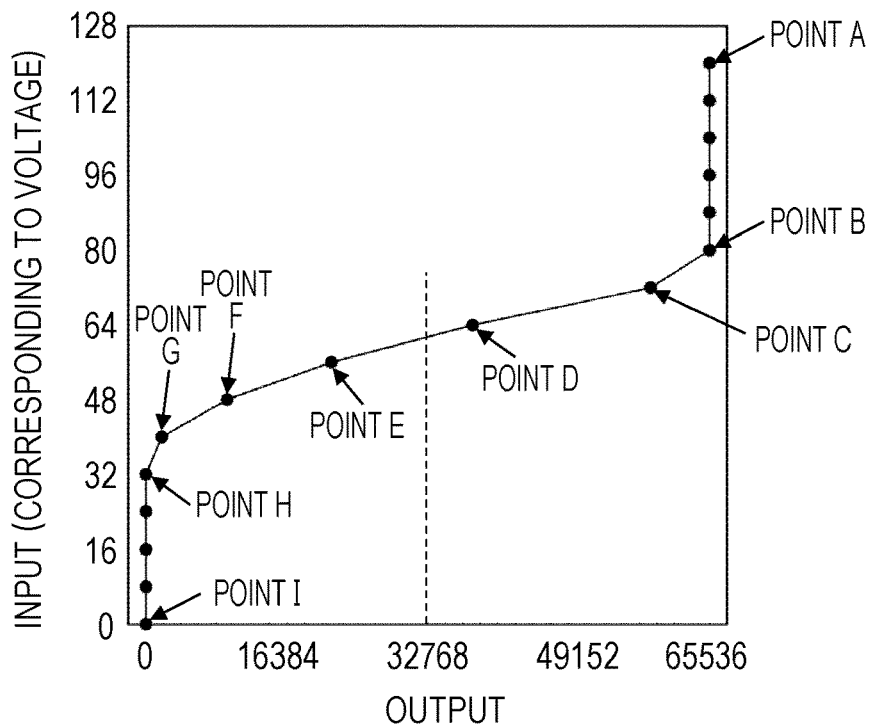
FIG. 7 is a graph for explaining an example of thinning out a part of points to derive the inverse characteristic.

In the embodiment described above, the inverse characteristic is derived by using all the points (points indicating the relationship between the input voltage and the output) obtained in the input-output characteristic. In this embodiment, all points in the input-output characteristic are not used and a part of the points is thinned out to derive an inverse characteristic. For example, for a section where the relationship between the input voltage and the output is substantially linear, a part of the section is thinned out to derive the inverse characteristic. Description will be made with reference to FIG. 7. FIG. 7 is a graph for explaining an example of thinning out a part and deriving the inverse characteristic. As illustrated in FIG. 7, for a section (from point B to point G in FIG. 7) where the relationship between the input voltage and the output is substantially linear, the inverse characteristic is derived by thinning out a part of the section, not all the points. For the thinned out section, the input voltage is derived from the points (the point corresponding to the output larger than the obtained output and the point corresponding to the output smaller than the obtained output) before and after the obtained output. For example, in the example illustrated in FIG. 7, if the obtained output is 49152, the corresponding input voltage is derived by performing linear interpolation using the point C and the point D. If the obtained output is 16384, the corresponding input voltage is derived by performing linear interpolation using the point E and the point F.

With this configuration, it is possible to reduce the amount of calculation used for inverse transformation.

Embodiment 3

Still another embodiment of the present disclosure will be described below. For convenience of explanation, members having the same functions as the members described in the embodiments described above are denoted by the same reference numerals, and description thereof will not be repeated.

Figure 8:
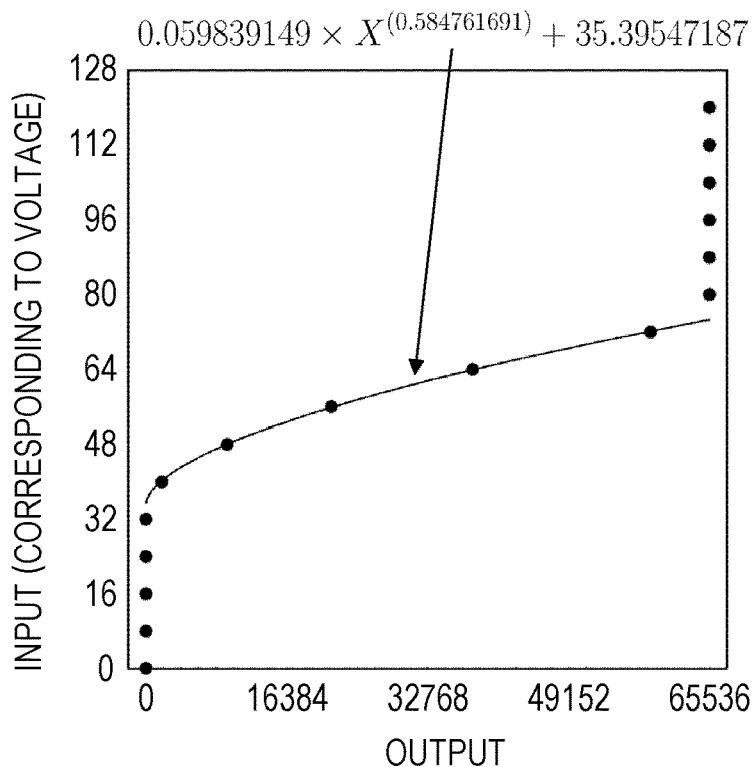
FIG. 8 is a graph for explaining an example of expressing the inverse characteristic by an expression including three parameters.

In this embodiment, the calibration characteristic deriving unit 103 derives the calibration characteristic by expressing the inverse characteristic of the input-output characteristic by an expression ($\alpha \times X^{\beta} + \gamma$) including the three parameters ($\alpha$, $\beta$, $\gamma$). Here, X represents an obtained output. For example, in the example illustrated in FIG. 8, $\alpha=0.059839149$, $\beta=0.584761691$, and $\gamma=35.39547187$. With this configuration, it is possible to obtain the corresponding input voltage by substituting the output obtained for X into the expression. Since the three parameters can be derived from the graph illustrating the inverse characteristic of the input-output characteristic using the related art, description thereof will be omitted.

Embodiment 4

Still another embodiment of the present disclosure will be described below. For convenience of explanation, members having the same functions as the members described in the embodiments described above are denoted by the same reference numerals, and description thereof will not be repeated.

Figure 9:
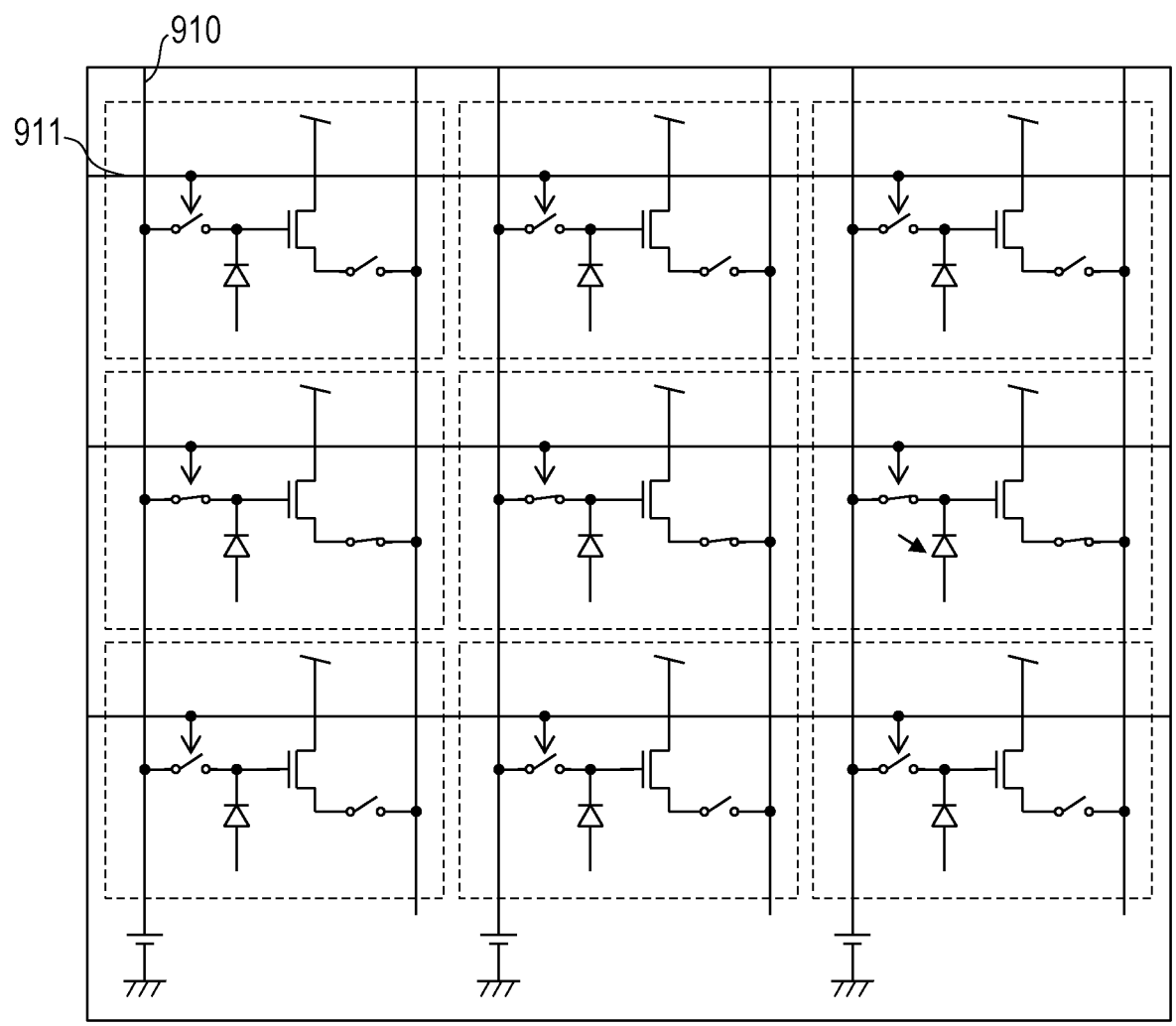
FIG. 9 is a circuit diagram for applying different reference potential for each pixel.
Figure 10A:
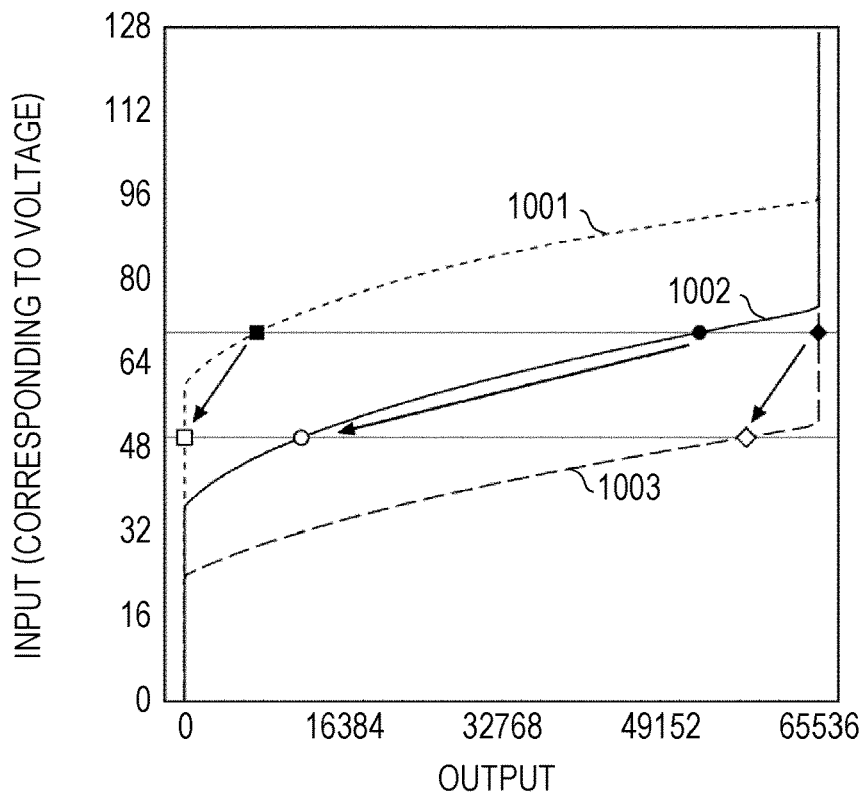
FIGS. 10A and 10B are graphs for explaining a reason why characteristics of pixel can be effectively utilized by making the reference potential different for each pixel.
Figure 10B:
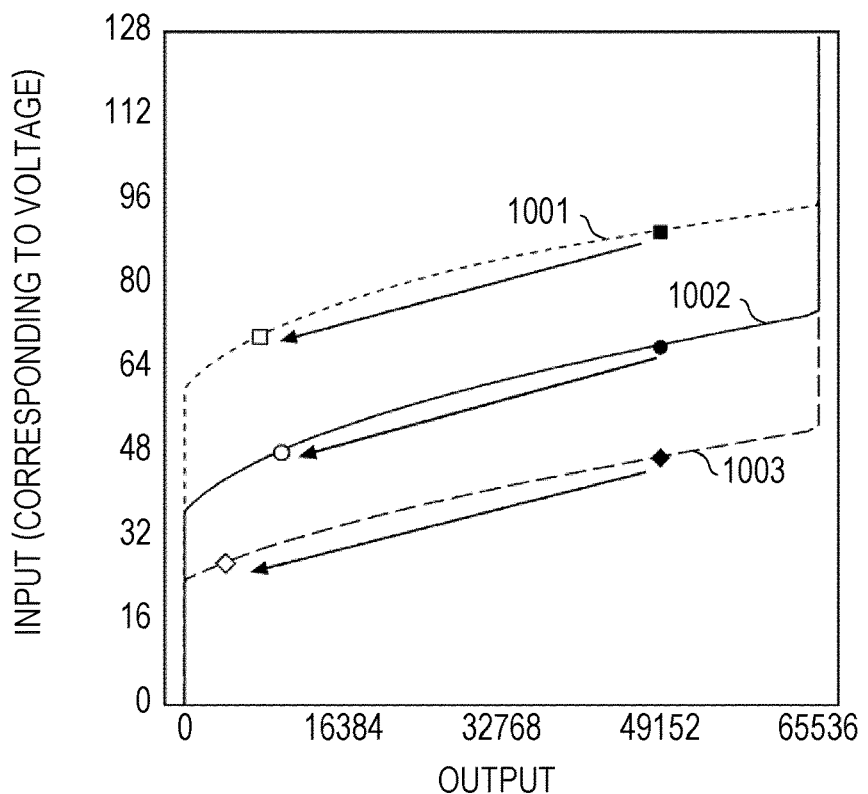

In this embodiment, a reset voltage determination unit (not illustrated) included in the calibration setting unit 100 provides different reference potential for each pixel 211. With this configuration, the reference potential corresponding to the characteristic of each pixel 211 can be taken, and the characteristic of each pixel 211 can be effectively used. Description will be made in detail with reference to FIGS. 9, 10A and 10B. FIG. 9 illustrates a circuit diagram for providing different reference potential for each pixel 211. FIGS. 10A and 10B are graphs for explaining the reason why the characteristics of the pixel 211 can be effectively utilized by making the reference potential different for each pixel 211. FIG. 10A illustrates an example in the case where the reference potential of the pixel 211 is set to a specific potential, and FIG. 10B illustrates an example in the case where the reference potential is made different for each pixel 211.

As illustrated in FIG. 9, in this embodiment, a calibration/reset voltage line 910 is commonly used only in a direction perpendicular to calibration/reset control lines 911. With this configuration, the calibration/reset voltage line 910 can provide the same reference potential for the pixels 211 in the row direction. Then, the calibration/reset control line 911 can control the calibration/reset switch 251 for the pixels 211 in the column direction. With this configuration, it is possible to provide different reference potential for each pixel 211.

FIG. 10A illustrates an example of the input-output characteristics of three pixels 211. In the case where there are three pixels 211 having different characteristics as illustrated in FIG. 10A, when the reference potential is set to a specific potential (for example, 70), the portion where the characteristic changes can be effectively used in the pixel 211 indicated by the characteristic 1002, but in the pixel 211 indicated by the characteristic 1001 and the characteristic 1003, the portion where the characteristic changes can hardly be used. In contrast, as illustrated in FIG. 10B, if the reference potential is made different for each pixel 211, for example, the reference; potential of the pixel 211 indicated by the characteristic 1001 is set to 90, the reference potential of the pixel 211 indicated by the characteristic 1002 is set to 70, and the reference; potential of the pixel 211 indicated by the characteristic 1003 is set to 48, it is possible to effectively utilize the portion where the characteristic changes in each pixel 211.

Since each pixel 211 has a different reference potential, a value corresponding to the different reference potential is output for each pixel 211 as it is. In contrast, the difference between the obtained output and the output in the case of the entire reference potential (for example, 70) at the time of measurement may be derived and an appropriate gain may be multiplied to the difference to obtain data of the desired number of bits.

Embodiment 5

Still another embodiment of the present disclosure will be described below. For convenience of explanation, members having the same functions as the members described in the embodiments described above are denoted by the same reference numerals, and description thereof will not be repeated.

In this embodiment, the calibration setting unit 100 determines whether derivation of the calibration characteristic is demanded again after a lapse of a predetermined period of time since deriving the calibration characteristic. When it is determined that derivation of the calibration characteristic is demanded, the calibration setting unit 100 derives the calibration characteristic again.

Specifically, after a lapse of a predetermined period of time since deriving the calibration characteristic, the input voltage setting unit 101 sets a specific input voltage (for example, V60) and instructs the voltage generation unit 22 to apply the input voltage to the pixel 211. The setting output value acquisition unit 102 acquires the output when the input voltage is applied to the pixel 211. Then, the calibration setting unit 100 compares the output obtained when the input voltage V60 was applied the previous time and the current output, and when the difference exceeds the predetermined value, the calibration setting unit 100 again derives the calibration characteristic. The method of deriving the calibration characteristic is the same as the method described above.

With this configuration, the gain and offset of the pixel 211 are changed due to changes in the ambient environment such as temperature, humidity, and operation time, and the calibration characteristic can be appropriately derived even when the characteristic is changed.

Determination as to whether or not to perform the calibration again may be performed using a plurality of input voltages, A configuration in which the user is notified that it is better to perform the second calibration instead of automatically performing the calibration again may be adopted.

Embodiment 6

Still another embodiment of the present disclosure will be described below. For convenience of explanation, members having the same functions as the members described in the embodiments described above are denoted by the same reference numerals, and description thereof will not be repeated.

In this embodiment, the calibration setting unit 100 derives input-output characteristic performing interpolation between measurement points by using a predetermined number of the measurement points, without using all points in the input-output characteristic. Furthermore, the calibration setting unit 100 derives the input-output characteristic using different interpolation formulas depending on the section of the measurement points.

Figure 11:
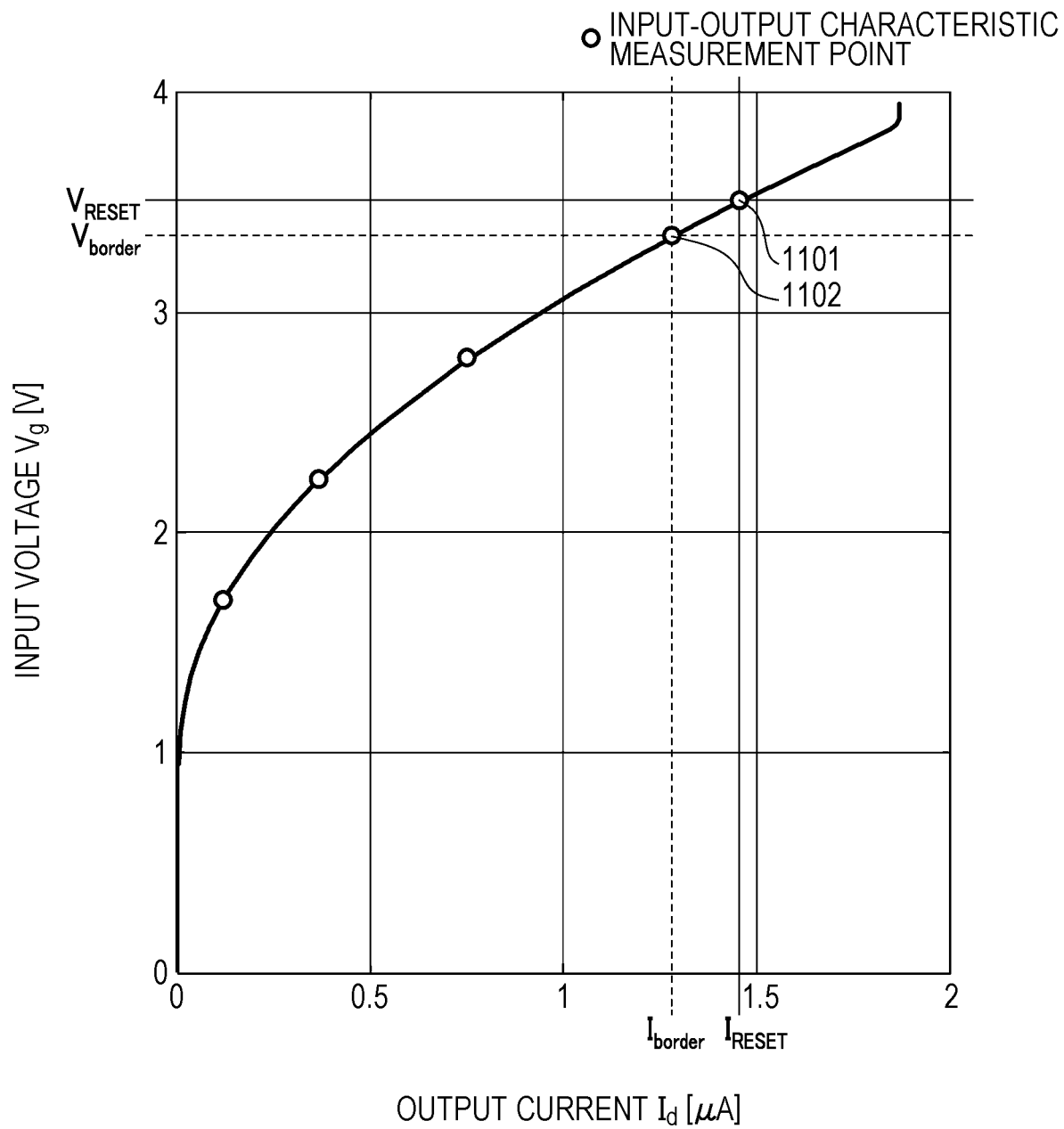
FIG. 11 is a graph for explaining a derivation example of an input-output characteristic according to another embodiment.

Specifically, description will be made with reference to FIG. 11. FIG. 11 is a graph for explaining an example in which the input-output characteristic is derived using different interpolation formulas depending on a section. In FIG. 11, the vertical axis represents an input voltage $V_g$ (V) and the horizontal axis represents an output current $I_d$ (µA) corresponding to the input voltage $V_g$. In this embodiment, for a section A ($V_{RESET} > V_g > V_{border}$, $I_{reset} > I_d > I_{border}$) (first section) where the input voltage $V_g$ is from the reset voltage $V_{RESET}$ (point 1101) to the threshold $V_{border}$ (point 1102), the calibration setting unit 100 shortens a measurement interval and performing interpolation by linear (linear expression) interpolation. For a section B ($V_g < V_{border}$, $I_d < I_{border}$) (second section) smaller than the threshold $V_{border}$ (point 1102), the measurement interval is increased and interpolation is performed by nonlinear (second order or higher order polynomial, exponential function, and the like) interpolation. For example, in the section A, interpolation is performed by $V_g = a \cdot I_d + b$ (a and b are coefficients) and in the section B, interpolation is performed by $V_g = f_{nl}(I_d)$ ($f_{nl}()$ is a nonlinear function (second order or higher order polynomial, exponential function, and the like). As examples of the second order or higher order polynomial, Lagrange interpolation, Spline interpolation, Hermite interpolation, and the like are included.

In the section A in which the amount of change from the reset voltage is small, since the S/N ratio (signal-to-noise ratio) decreases and the measurement interval is shortened and the linear interpolation is performed to increase accuracy of derivation. On the other hand, in the section B in which the amount of change from the reset voltage is large, since the S/N ratio increases, the measurement interval is increased. With this configuration, the measurement time and data amount can be reduced. In a case where the measurement interval is large, the relationship between the input voltage and the output current does not become linear and thus, the nonlinear interpolation is performed.

In general, the input-output characteristic (and the inverse characteristic thereof) varies with time. Therefore, in order to use appropriate characteristics, it is desirable to derive the input-output characteristic by using the value measured just as shortly as possible before imaging. However, if the number of measurement points is large, it takes time to measure and it becomes difficult to derive an appropriate characteristic.

In this embodiment, since it is possible to derive an appropriate input-output characteristic with a small number of measurement points, it is possible to derive the appropriate input-output characteristic even immediately before imaging.

In FIG. 11, measurement points in the section A in which linear interpolation is performed are only the two points of the point 1101 and the point 1102, but the number of measurement points in the section where the linear interpolation is performed is not limited to two points, and may be three or more points may be used.

Embodiment 7

Still another embodiment of the present disclosure will be described below. For convenience of explanation, members having the same functions as the members described in the embodiments described above are denoted by the same reference numerals, and description thereof will not be repeated.

In the Embodiment 6 described above, the input-output characteristic is derived by making the interpolation formula to be used different in accordance with the section. In this embodiment, the input-output characteristic is derived using the same interpolation formula as in the Embodiment 6, but measurement frequency is made to be different in accordance with the section.

Specifically, the calibration setting unit 100 according to this embodiment performs measurement with higher frequency than the section B for the section A to derive input-output characteristic. For example, for the measurement points included in the section A, measurements may be performed immediately before and immediately after the imaging, and measurement points included in the section B are measured a predetermined time has elapsed from the previous measurement.

As described above, for the section A, since the S/N ratio is low, the influence of the error at the time when the input-output characteristic is derived and the imaging time is great with the lapse of time. Therefore, for the section A, measurements are performed as soon as possible just before imaging to derive the input-output characteristic. On the other hand, for the section B, since the S/N ratio is high, the influence of the error at the time when the input-output characteristic is derived and the imaging time is smaller for the section A than at the section.

Embodiment 8

Still another embodiment of the present disclosure will be described below. For convenience of explanation, members having the same functions as the members described in the embodiments described above are denoted by the same reference numerals, and description thereof will not be repeated.

In the Embodiment 6 described above, the input-output characteristic is derived using the relationship between the input voltage and the output current at the measurement point. In this embodiment, the input-output characteristic is derived based on an amount of change from the reset voltage $V_{RESET}$ and the reset current $I_{RESET}$ which is the current value at that time, instead of the relationship between the input voltage and the output current at the measurement point.

Specifically, description will be made with reference to FIG. 12. FIG. 12 is a graph for explaining an example of deriving the input-output characteristic based on the amount of change. In FIG. 12, the vertical axis represents a difference from the reset voltage of the input voltage, and the horizontal axis represents a difference from the reset current of the output current.

In this embodiment, the calibration setting unit 100 performs the linear interpolation, on the section A' ($\Delta V_g < V_{border}$, $\Delta I_d < I_{border}$) from the origin to the point 1201 corresponding to the section A and performs the nonlinear interpolation, on the section B' ($\Delta V_g < V_{border}$, $\Delta I_d > I_{border}$), in which the difference in input voltage is greater than the point 1201, corresponding to the section B to derive the input-output characteristic. For example, for the section A', interpolation is performed by $\Delta V_g = a' \cdot I_d + b'$ (a' and b' are coefficients) and for the section B', interpolation is performed by $\Delta V_g = f'_{nl}(I_d)$ ($f'_{nl}()$ is a nonlinear function (second order or higher order polynomial, exponential function, and the like).

As described above, the input-output characteristic is derived to derive the calibration characteristic. Then, the derived calibration characteristic is used for deriving the irradiation amount of X-rays corresponding to the input voltage from the output current. Accordingly, it is only demanded to finally derive the irradiation amount of X-rays corresponding to the output current. In order to derive the irradiation amount of X-rays, the values of the input voltage and the output current may not be demanded, and it is sufficient to know the amount of change from the time of resetting (without X-ray irradiation. Therefore, as in this embodiment, the input-output characteristic may be derived by using the characteristic of the amount of change from the reset time.

Embodiment 9

Still another embodiment of the present disclosure will be described below. For convenience of explanation, members having the same functions as the members described in the embodiments described above are denoted by the same reference numerals, and description thereof will not be repeated.

Generally, it is known that a threshold voltage of a thin film transistor (TFT) or a MOS field effect transistor (MOSFET) changes with time. Since the input-output characteristic changes before and after the threshold voltage fluctuates, the calibration characteristic derived using the input-output characteristic before the threshold voltage fluctuates becomes inappropriate after the threshold voltage change.

Figure 13A:
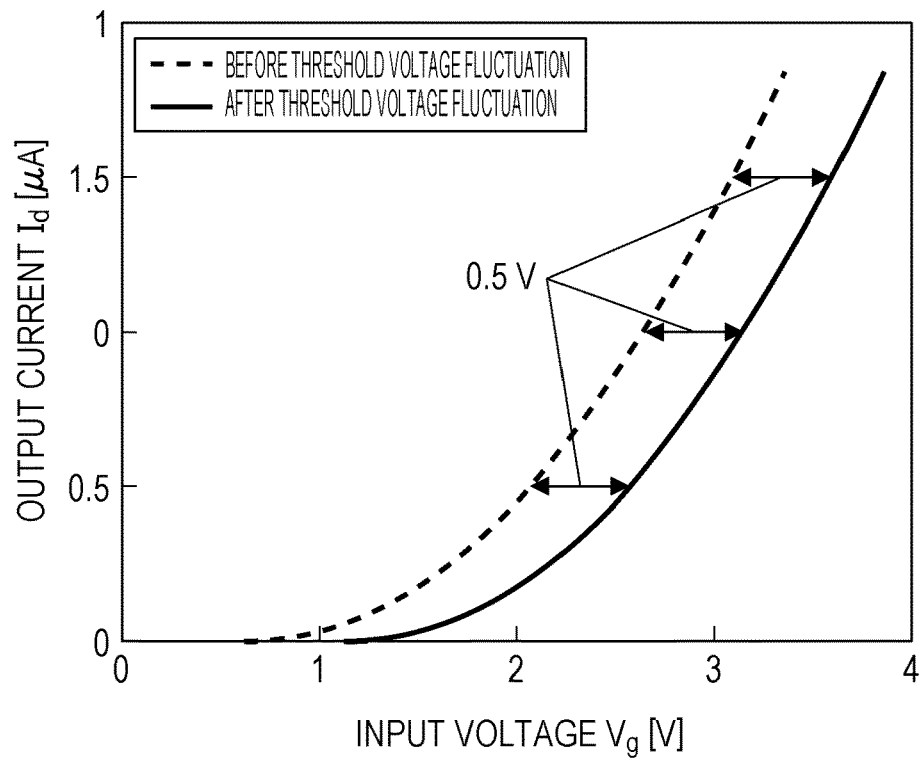
FIG. 13A is a graph illustrating change in the input-output characteristic when a threshold voltage fluctuates.
Figure 13B:
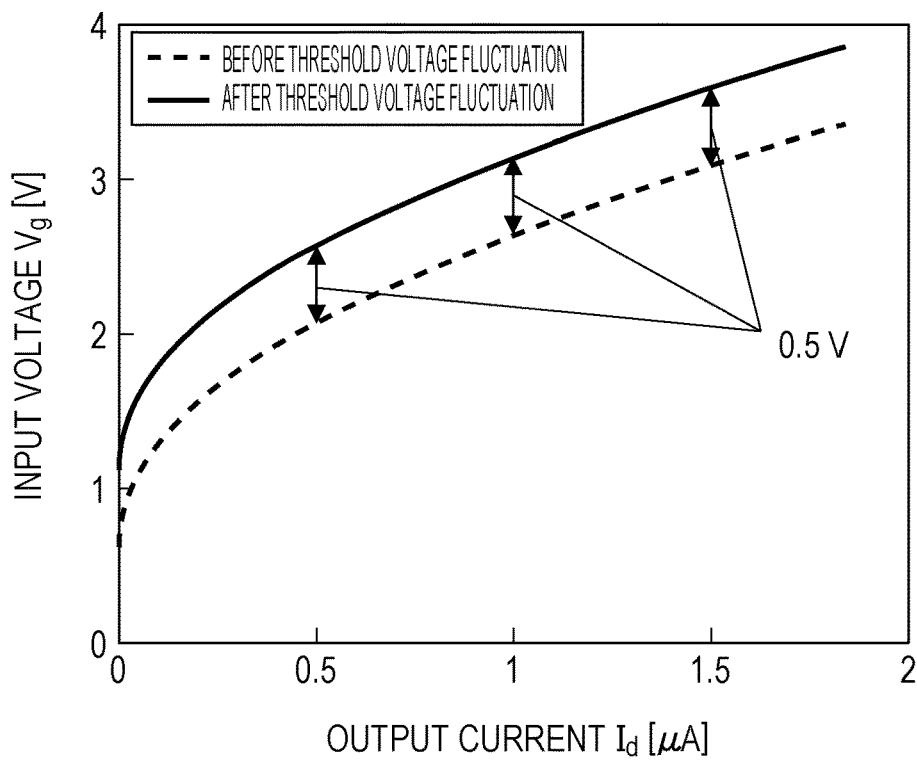
FIG. 13B is a graph illustrating an inverse characteristic thereof.

With reference to FIG. 13, a change in the input-output characteristic due to fluctuation in the threshold voltage will be described. FIG. 13A is a graph illustrating a change in the input-output characteristic when the threshold voltage fluctuates, and FIG. 13B is a graph illustrating an inverse characteristic of the input-output characteristic.

As illustrated in FIGS. 13A and 13B, for example, in a case where the threshold voltage increases by 0.5 V, the input-output characteristic after the threshold value fluctuation has such a characteristic that an offset of 0.5 V is applied to the input voltage in the input-output characteristic before the threshold fluctuation. Further, as illustrated in FIG. 13B, the inverse characteristic of the input-output characteristic also has such a characteristic that an offset of 0.5 V is applied to the input voltage in the output-input characteristic before the threshold value fluctuation.

Accordingly, if the calibration value (estimated value of the input corresponding to the output value) is derived by using the calibration characteristic derived using the input-output characteristic before the threshold voltage fluctuates, deviation from an actual input value occurs.

Therefore, the calibration unit 120 according to this embodiment sets the difference value of the calibration values before and after the X-ray irradiation, instead of the calibration value, as the value to be output. With this configuration, it is possible to remove the influence of fluctuation of the threshold voltage. The reason why the influence due to the fluctuation of the threshold voltage can be removed by setting the difference value as the value to be output will be described below.

As described above, the influence on the input-output characteristic due to the fluctuation of the threshold voltage is only the offset applied to the input voltage. Therefore, the difference between the calibration value for the output before the X-ray irradiation derived using the calibration characteristic derived before the threshold voltage fluctuation and the calibration value for the output after the X-ray irradiation is the same as a difference in a case where there is no deviation from the difference between the calibration value for the output before the X-ray irradiation derived using the calibration characteristic derived after the threshold voltage fluctuation and the calibration value for the output after the X-ray irradiation, that is, the actual value.

Then, the difference between the calibration values before and after the X-ray irradiation corresponds to the received light amount (dose). Therefore, the calibration unit 120 sets the difference between the calibration values before and after X-ray irradiation as data to be transmitted to the output unit. With this configuration, an accurate value can be set as output data without being affected by fluctuation of the threshold voltage.

Figure 14:
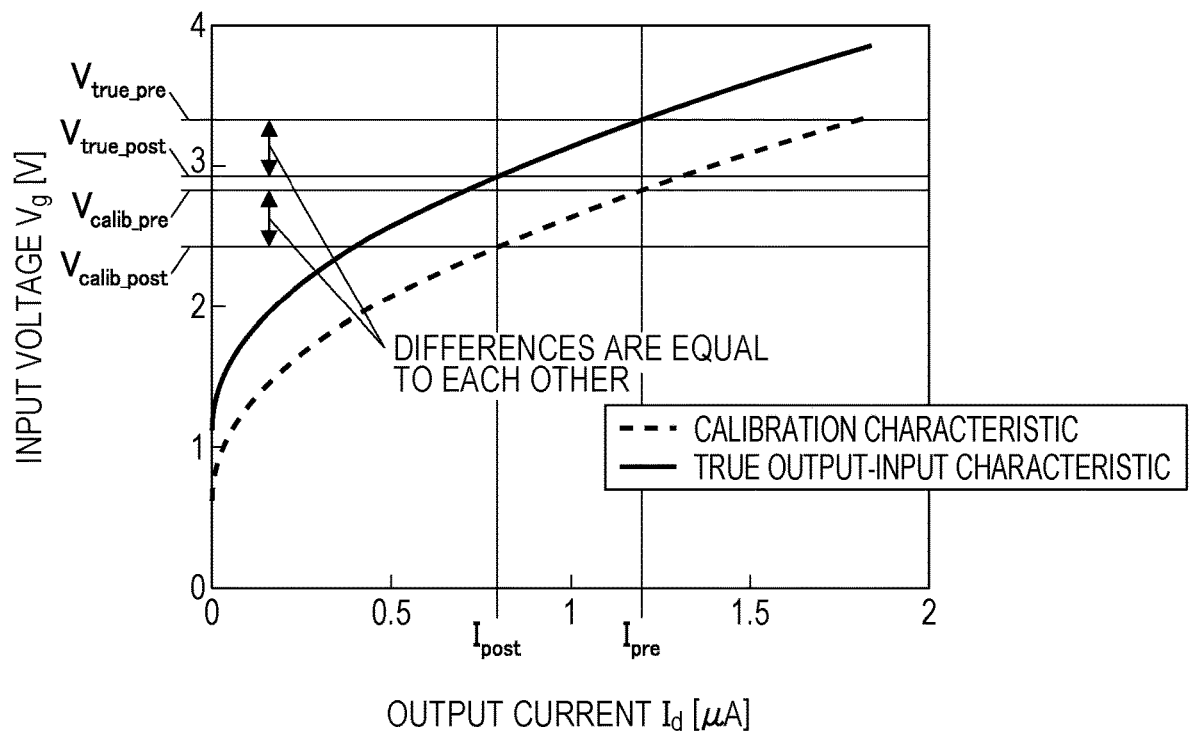
FIG. 14 is a graph for explaining a reason why a calibration processing result is not affected by fluctuation of a threshold voltage by using a difference value.

With reference to FIG. 14, description will be made in detail. FIG. 14 is a graph for explaining the reason why the input-output characteristic is not affected by the fluctuation of the threshold voltage by using the difference value. In FIG. 14, the calibration characteristic derived based on the input-output characteristic before the threshold value fluctuation is specified as a "calibration characteristic." and the actual characteristic is described as a "true output-input characteristic".

$I_{pre}$ is an output value (current) before X-ray irradiation and $I_{post}$ is an output value (current) after the X-ray irradiation. In a case where the threshold voltage fluctuates, a calibration value $V_{calib\_pre}$ and an actual input value $V_{true\_pre}$ for $I_{pre}$ have different values, and a calibration value $V_{calib\_post}$ and an actual input value $V_{true\_post}$ for $I_{post}$ also have different values. However, the difference ($V_{calib\_pre} - V_{calib\_post}$) between the calibration values before and after the X-ray irradiation is equal to the difference ($V_{true\_pre} - V_{true\_post}$) between the actual input values. Therefore, by using the difference value, the influence of fluctuation of the threshold voltage can be removed.

[Implementation Example by Software]

A control block (especially, the calibration setting unit 100 (the input voltage setting unit 101, the setting output value acquisition unit 102, the calibration characteristic deriving unit 103) of the calibration apparatus 10 may be realized by a logic circuit (hardware) formed in an integrated circuit (IC chip) or the like, or may be realized by software.

In the latter case, the calibration apparatus 10 includes a computer that executes instructions of a program, which is software for realizing each function. The computer includes, for example, at least one processor (control device) and at least one computer-readable recording medium storing the program. It is desirable to be achieved by the processor reading the program from, the recording medium and executing the program in the computer. As the processor, for example, a central processing unit (CPU) can be used. As the recording medium, a tape, a disk, a card, a semiconductor memory, a programmable logic circuit, or the like can be used, in addition to a "non-temporary tangible medium." such as a read only memory (ROM). The computer may further include a random access memory (RAM) and the like for developing the program. Further, the program may be supplied to the computer through any transmission medium (a communication network, a broadcast wave or the like) capable of transmitting the program. One aspect of the present disclosure can also be realized in the form of a data signal embedded in a carrier wave which is embodied by electronic transmission of the program.

[Summarization]

An imaging system (1) according to an aspect 1 of the present disclosure including a plurality of pixels (211) each of which includes a sensor element (photodiode 252) for generating an electrical signal based on a dose of incident radiation and an amplification transistor (Amp transistor 253) for amplifying the electrical signal, the imaging system including a voltage application unit (input voltage setting unit 101) that applies an input voltage to an amplification transistor at predetermined intervals, an acquisition unit (setting output value acquisition unit 102) that acquires an output corresponding to the input voltage for each of the pixels, and a calibration characteristic deriving unit (103) that derives, for each of the pixels, an input-output characteristic indicating a correspondence relationship between the input voltage and the output corresponding to the input voltage and derives a calibration characteristic to be used for calibration based on an inverse characteristic of the input-output characteristic.

According to the configuration described above, for each pixel, an input-output characteristic indicating a correspondence relationship between the input voltage and the output corresponding to the input voltage is derived and a calibration characteristic to be used for calibration is derived based on an inverse characteristic of the input-output characteristic. With this configuration, it is possible to derive the calibration characteristic corresponding to the pixel without making radiation incident onto the sensor element. Therefore, it is possible to easily calibrate the output of the pixel.

In the aspect 1, in the imaging system, according to an aspect 2 of the present disclosure, the calibration characteristic deriving unit may derive the calibration characteristic based on the inverse characteristic of the input-output characteristic obtained by thinning out a part of the input voltage applied by the voltage application unit.

According to the configuration described above, since the calibration characteristic is derived based on the inverse characteristic of the input-output characteristic obtained by thinning out a part of the input voltage, a processing amount for deriving the inverse characteristic can be reduced.

In the aspect 1, in the imaging system according to an aspect 3 of the present disclosure, the calibration characteristic deriving unit may derive the calibration characteristic by expressing the inverse characteristic by an expression including three parameters.

According to the configuration described above, it is possible to derive the calibration characteristic by an expression including three parameters.

In the aspect 1, the imaging system according to an aspect 4 of the present disclosure may further include a reset voltage determination unit that determines a reset voltage to be applied to the amplification transistor based on the input-output characteristic.

According to the configuration described above, since the reset voltage is determined based on the input-output characteristic, the input-output characteristic can be effectively used for each pixel as compared with the case where the same reset voltage is applied to all pixels.

In any one of the aspects 1 to 3, in the imaging system according to an aspect 5 of the present disclosure, the calibration characteristic deriving unit may acquire, after a lapse of a predetermined period of time since deriving the calibration characteristic, an output corresponding to a predetermined input voltage and, in a case where the difference between the output and an output corresponding to the input voltage when the calibration characteristic was derived last time exceeds a threshold value, derive the calibration characteristic again.

According to the configuration described above, when the calibration characteristic derived last time is inappropriate, an appropriate calibration characteristic can be derived again.

According to an aspect 6 of the present disclosure, there is provided a control method of an imaging system including a plurality of pixels each of which includes a sensor element for generating an electrical signal based on a dose of incident radiation and an amplification transistor for amplifying the electrical signal, the control method including applying an input voltage to an amplification transistor at predetermined intervals, acquiring an output corresponding to the input voltage for each of the pixels, and deriving, for each of the pixels, an input-output characteristic indicating a correspondence relationship between the input voltage and the output corresponding to the input voltage and deriving a calibration characteristic to be used for calibration based on an inverse characteristic of the input-output characteristic.

In the aspect 1, in the imaging system according to an aspect 7 of the present disclosure, the calibration characteristic deriving unit may derive the calibration characteristic deriving unit derives the input-output characteristic by using different interpolation formulas in a first section corresponding to the input voltage less than or equal to a threshold value and a second section corresponding to the input voltage greater than the threshold value.

According to the configuration described above, since the interpolation formulas used before and after the threshold are made different, the input-output characteristics can be derived by using the interpolation formulas appropriately corresponding to the respective sections. The input-output characteristic can be derived by interpolation by the interpolation formula and thus, the processing amount can be reduced and the processing time can be shortened.

In the aspect 7, in the imaging system according to an aspect 8 of the present disclosure, the calibration characteristic deriving unit may make frequency at which the input-output characteristic is derived different in the first section and the second section.

According to the configuration described above, since the input-output characteristic can be derived at an appropriate frequency in accordance with the section, it is possible to suppress deriving the input-output characteristic wastefully.

In the aspect 1, in the imaging system according to an aspect 9 of the present disclosure, the calibration characteristic deriving unit may derive the input-output characteristic based on a change amount from a predetermined value of the input voltage.

According to the configuration described above, it is possible to derive the input-output characteristic based on the change amount from the predetermined value.

In the aspects 1 to 5 and 7 to 9, the imaging system according to an aspect 10 of the present disclosure may further include a calibration unit that outputs a difference value between the calibration value derived using the calibration characteristic before imaging and the calibration value after imaging as a result of the calibration.

According to the configuration described above, even when the threshold voltage of the amplification transistor fluctuates, an appropriate value can be output.

The imaging system according to each aspect of the present disclosure may be realized by a computer, and in this case, a control program, of the imaging system that causes the computer to realize the imaging system by causing the computer to operate as each part (software element) of the imaging system, and a computer readable storage medium in which the control program is stored fall within the scope of the present disclosure.

The present disclosure is not limited to the respective embodiments described above, and various modifications may be made thereto within the scope set forth in the claims, and embodiments obtained by appropriately combining technical means respectively disclosed in different embodiments are also included in the technical scope of the present disclosure. Furthermore, new technical features can be formed by combining technical means disclosed in the respective embodiments.

The present disclosure contains subject matter related to that disclosed in Japanese Priority Patent Application JP 2018-081760 filed in the Japan. Patent Office on Apr. 20, 2018 and Japanese Priority Patent Application JP 2018-245853 filed in the Japan Patent Office on Dec. 27, 2018 the entire contents of which, are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system including a plurality of pixels each of which includes a sensor element for generating an electrical signal based on a dose of incident radiation and an amplification transistor for amplifying the electrical signal, the imaging system comprising:
   voltage application circuitry that applies an input voltage to the amplification transistor at predetermined intervals;
   acquisition circuitry that acquires an output corresponding to the input voltage for each of the pixels; and
   calibration characteristic circuitry that derives, for each of the pixels, an input-output characteristic indicating a correspondence relationship between the input voltage and the output corresponding to the input voltage and derives a calibration characteristic to be used for calibration based on an inverse characteristic of the input-output characteristic,
   wherein the calibration characteristic deriving circuitry derives the calibration characteristic based on the inverse characteristic of the input-output characteristic obtained by thinning out a part of the input voltage applied by the voltage application circuitry.

2. The imaging system according to claim 1, wherein the calibration characteristic deriving circuitry derives the calibration characteristic by expressing the inverse characteristic by an expression including three parameters.

3. The imaging system according to claim 1, wherein the calibration characteristic deriving circuitry derives the input-output characteristic by using different interpolation formulas between a first section corresponding to the input voltage less than or equal to a threshold value and a second section corresponding to the input voltage greater than the threshold value.

4. The imaging system according to claim 3, wherein the calibration characteristic deriving circuitry makes frequency at which the input-output characteristic is derived different between the first section and the second section.

5. The imaging system according to claim 4, wherein the calibration characteristic deriving circuitry derives the input-output characteristic based on a change amount from a predetermined value of the input voltage.

6. The imaging system according to claim 1, further comprising:
   reset voltage circuitry that determines a reset voltage to be applied to the amplification transistor based on the input-output characteristic.

7. A storage medium storing a control program for causing a computer to function as the imaging system according to claim 1, the computer being caused to function as:

the voltage application circuitry;
the acquisition circuitry; and
the calibration characteristic deriving circuitry.

8. An imaging system including a plurality of pixels each of which includes a sensor element for generating an electrical signal based on a dose of incident radiation and an amplification transistor for amplifying the electrical signal, the imaging system comprising:
- voltage application circuitry that applies an input voltage to the amplification transistor at predetermined intervals;
- acquisition circuitry that acquires an output corresponding to the input voltage for each of the pixels;
- calibration characteristic deriving circuitry that derives, for each of the pixels, an input-output characteristic indicating a correspondence relationship between the input voltage and the output corresponding to the input voltage and derives a calibration characteristic to be used for calibration based on an inverse characteristic of the input-output characteristic; and
- calibration circuitry that outputs a difference value between a calibration value derived using the calibration characteristic before imaging and the calibration value after imaging as a result of the calibration.

9. An imaging system including a plurality of pixels each of which includes a sensor element for generating an electrical signal based on a dose of incident radiation and an amplification transistor for amplifying the electrical signal, the imaging system comprising:
- voltage application circuitry that applies an input voltage to the amplification transistor at predetermined intervals;
- acquisition circuitry that acquires an output corresponding to the input voltage for each of the pixels; and
- calibration characteristic deriving circuitry that derives, for each of the pixels, an input-output characteristic indicating a correspondence relationship between the input voltage and the output corresponding to the input voltage and derives a calibration characteristic to be used for calibration based on an inverse characteristic of the input-output characteristic,
  wherein the calibration characteristic deriving circuitry acquires, after a lapse of a predetermined period of time since deriving the calibration characteristic, an output corresponding to the input voltage which is predetermined and, in a case where a difference between the output and an output corresponding to the input voltage when the calibration characteristic was derived last time exceeds a threshold value, derives the calibration characteristic again.

* * * * *